United States Patent
Katsuramaki

(10) Patent No.: US 10,150,434 B2
(45) Date of Patent: Dec. 11, 2018

(54) POWER FEED STRUCTURE FOR MOVABLE BODY

(71) Applicant: YAZAKI CORPORATION, Tokyo (JP)

(72) Inventor: Takahiko Katsuramaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/460,290

(22) Filed: Mar. 16, 2017

(65) Prior Publication Data
US 2017/0274846 A1  Sep. 28, 2017

(30) Foreign Application Priority Data
Mar. 28, 2016 (JP) .................................. 2016-063415

(51) Int. Cl.
| | | |
|---|---|---|
| *B60R 16/03* | (2006.01) | |
| *H02G 11/02* | (2006.01) | |
| *B60R 16/027* | (2006.01) | |
| *B60J 7/043* | (2006.01) | |

(52) U.S. Cl.
CPC .............. *B60R 16/03* (2013.01); *B60J 7/043* (2013.01); *B60R 16/027* (2013.01); *H02G 11/02* (2013.01)

(58) Field of Classification Search
CPC ............................... H02G 11/02; B60R 16/03
USPC .................... 191/12.2 R; 174/50; 242/378.1; 296/211, 155
See application file for complete search history.

(56) References Cited

U.S. PATENT DOCUMENTS

| | | | | |
|---|---|---|---|---|
| 6,254,176 B1* | 7/2001 | Hare | ......................... | B60J 7/043 296/211 |
| 6,517,148 B1* | 2/2003 | Teschner | .................... | B60J 7/00 296/211 |
| 8,038,468 B2* | 10/2011 | Lu | .......................... | B65H 75/34 439/501 |
| 2003/0184411 A1* | 10/2003 | Sano et al. | ..................... | 296/155 |

FOREIGN PATENT DOCUMENTS

| | | |
|---|---|---|
| JP | S60-142123 U | 9/1985 |
| JP | H09-259647 A | 10/1997 |
| JP | H10-203735 A | 8/1998 |
| JP | 2010-213399 A | 9/2010 |
| JP | 2011-151906 A | 8/2011 |

OTHER PUBLICATIONS

Japanese office action dated Jul. 31, 2018 in a counterpart Japanese Patent application.

* cited by examiner

*Primary Examiner* — Dennis H Pedder
(74) *Attorney, Agent, or Firm* — Metrolexis Law Group, PLLC

(57) ABSTRACT

A power feed structure for movable body includes a flat electric wire having one end connected to a vehicle body and the other end connected to a sunroof, and an excess length absorbing mechanism for winding an excess portion of the flat electric wire. The excess length absorbing mechanism is arranged so as to be movable along a rail member. The excess length absorbing mechanism includes a rotating body having a wire winding part to wind the flat electric wire on the sunroof and the flat electric wire on the vehicle body, and a spiral spring for urging the rotating body to a winding direction to wind the flat electric wire on the sunroof and the flat electric wire on the vehicle body.

6 Claims, 17 Drawing Sheets

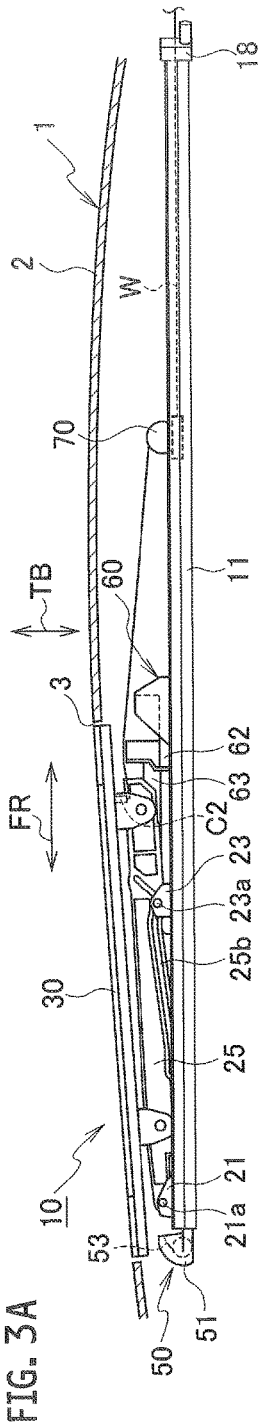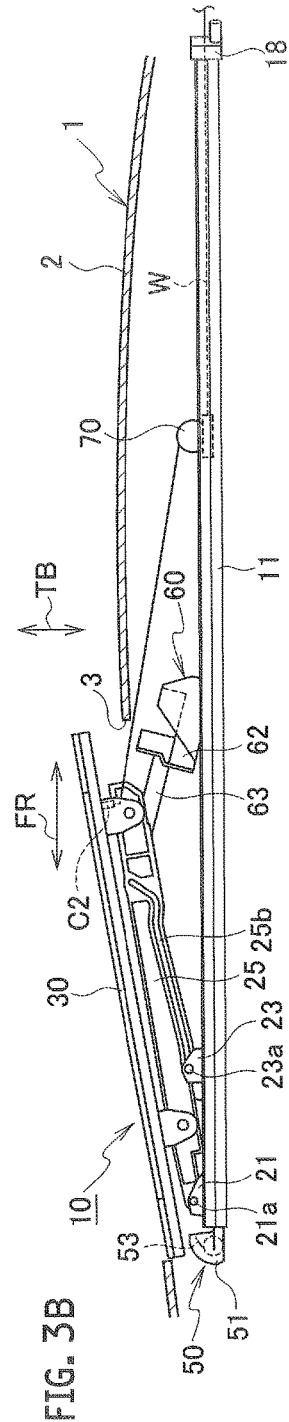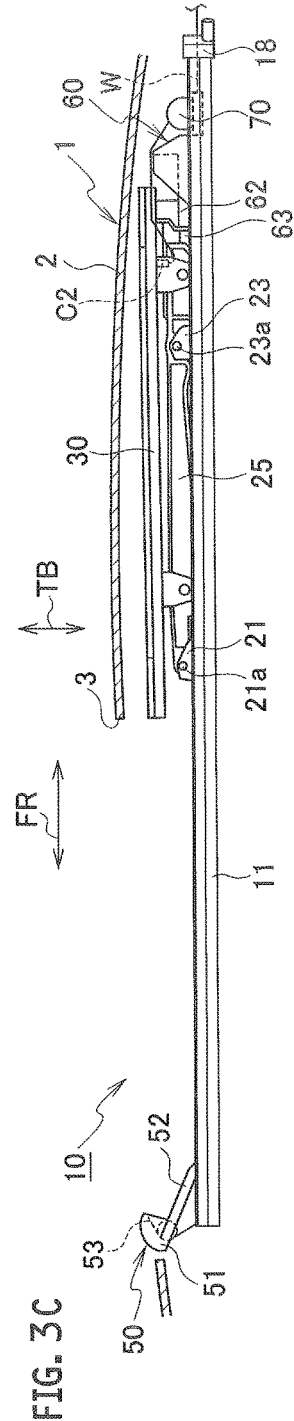
FIG. 3A
FIG. 3B
FIG. 3C

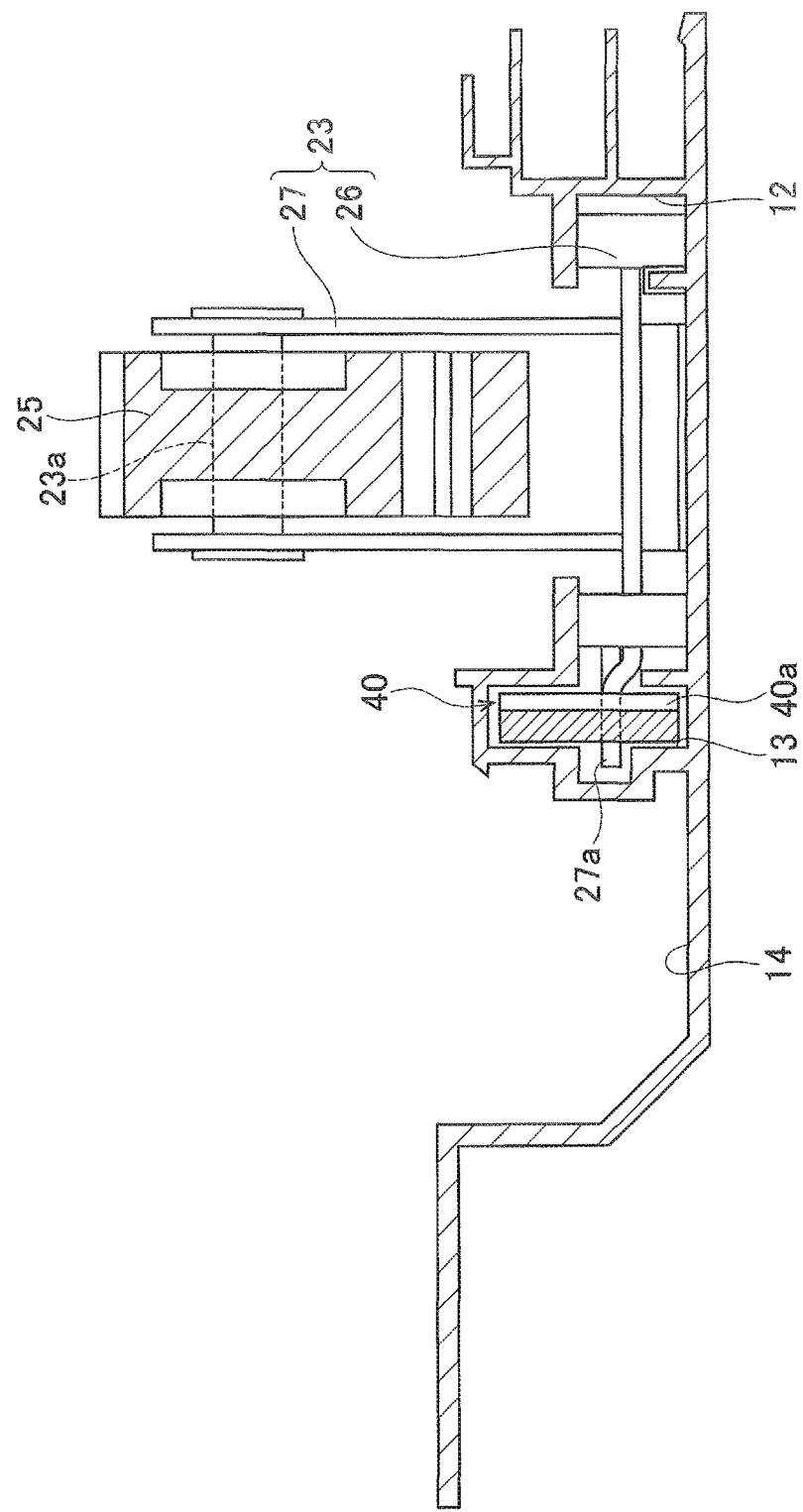

POWER FEED STRUCTURE FOR MOVABLE BODY

CROSS REFERENCE TO RELATED APPLICATION

The present application is based on, and claims priority from Japanese Patent Application No. 2016-063415, filed Mar. 28, 2016, the disclosure of which is hereby incorporated by reference herein in its entirety.

TECHNICAL FIELD

The present application relates to a power feed structure for movable body, which supplies power from one of a fixed part and a movable body to the other.

RELATED ART

On a vehicle body, for example, there are mounted various components which can move in relation to the vehicle body (i.e. movable bodies such as sunroof, sunshade, side glasses, and seats). As for power feeding for such movable bodies, a variety of structures has been proposed conventionally. For instance, a conventional example of a power feed structure for movable body disclosed in JP 2011-151906 A includes, as illustrated in FIGS. 16 to 19, a flat electric wire W, a first excess-length absorbing guide casing 100 fixed to a vehicle body as the fixed part, and a second excess-length absorbing guide casing 101 fixed to a sunroof as the movable body. The flat electric wire W has one end connected to the vehicle body and the other end connected to the sunroof, with a length long enough to follow the movement of the sunroof. As illustrated in FIG. 19, the flat electric wire W is provided with an elastic member 102 which serves to keep linearity of the wire W even when it is bent.

In a close position of the sunroof, as illustrated in FIG. 16, the second excess-length absorbing guide casing 101 is brought into a state folded on the first excess-length absorbing guide casing 100. In this state, the flat electric wire W is arranged in the first excess-length absorbing guide casing 100 and the second excess-length absorbing guide casing 101 in a folded state. Thus, an excess length of the flat electric wire W is absorbed.

In an open position of the sunroof, as illustrated in FIG. 17, the first excess-length absorbing guide casing 100 is separated from the second excess-length absorbing guide casing 101. In this state, the flat electric wire W is arranged linearly owing to the characteristics of the elastic member 102 to return to its original linear state.

In a tilt-up position of the sunroof, as illustrated in FIG. 18, the first excess-length absorbing guide casing 100 and the second excess-length absorbing guide casing 101 overlap one another while one end of the second excess-length absorbing guide casing 101 is being lifted up. In this state, as illustrated in FIG. 18, the flat electric wire W is arranged in the first excess-length absorbing guide casing 100 and the second excess-length absorbing guide casing 101 in a loosely-folded state. In this way, an excess length of the flat electric wire W is absorbed.

SUMMARY

In the conventional power feed structure for movable body, however, since it is necessary to attach the first excess-length absorbing guide casing 100 to the vehicle body and also attach the second excess-length absorbing guide casing 101 to the sunroof, there arises a problem the attachment operation is troublesome and additionally, the resulting structure is large-sized.

Different from the conventional example, alternatively, there may be expected a power feed structure using a general-purpose wire having no elastic member. However, such a power feed structure would be complicated in structure furthermore.

In such a situation, an object of the present application is to provide a power feed structure for movable body, which can be installed easily and configured compactly.

A power feed structure for movable body according to an aspect of the present application, includes a rail member fixed to a fixed part, a slider configured to move along the rail member, a movable body supported on the rail member, an electric wire having one end connected to the fixed part and the other end connected to the movable body, and an excess length absorbing mechanism configured to wind an excess portion of the electric wire. The power feed structure is configured so as to feed power from one of the fixed part and the movable body to the other. The excess length absorbing mechanism is arranged so as to be movable along the rail member. The excess length absorbing mechanism includes a rotating body having a wire winding part configured to wind the electric wire on the movable body and the electric wire on the fixed part, and an urging member configured to urge the rotating body to a winding direction to wind the electric wire on the movable body and the electric wire on the fixed part.

With the power feed structure according to the aspect of the present application, when the movable body moves in a direction away from the excess length absorbing mechanism, the rotating body rotates against an urging force of the urging member, so that the excess length absorption mechanism moves on the rail member toward the movable body while drawing out the electric wire on the movable body and the electric wire on the fixed part, both of which have been wound around the wire winding part. When the movable body moves in a direction approaching the excess length absorbing mechanism, the rotating body rotates by the urging force of the urging member and the excess length absorbing mechanism moves on the rail member in a direction away from the movable body while winding the electric wire on the movable body and the electric wire on the vehicle body around the wire winding part, so that an excess length of the wire is absorbed.

With the above constitution, as it is necessary only to attach the excess length absorbing mechanism to the rail member on which the slider moves and there is no need of installing a rail member special for the excess length absorbing mechanism, it can be installed with ease. Since the excess length absorbing mechanism includes the rotating body for winding the electric wire and the urging member for urging the rotating body wherein these elements (the rotating body and the urging member) are arranged about the rotation center, the mechanism is simple in structure. From above, it is possible to provide a power feed structure for movable body, which can be installed easily and configured compactly.

BRIEF DESCRIPTION OF DRAWINGS

FIG. 3A is a schematic side view illustrating a sunroof according to the embodiment positioned in a close position; FIG. 3B is a schematic side view illustrating the sunroof according to the embodiment positioned in a tilt-up position; and FIG. 3C is a schematic side view illustrating the sunroof according to the embodiment positioned in an open position.

FIG. 4 is a sectional view of a rear slider and a rail member of the sunroof unit according to the embodiment (sectional view taken along a line A-A of FIG. 1).

DESCRIPTION OF EMBODIMENTS

Figure 1:
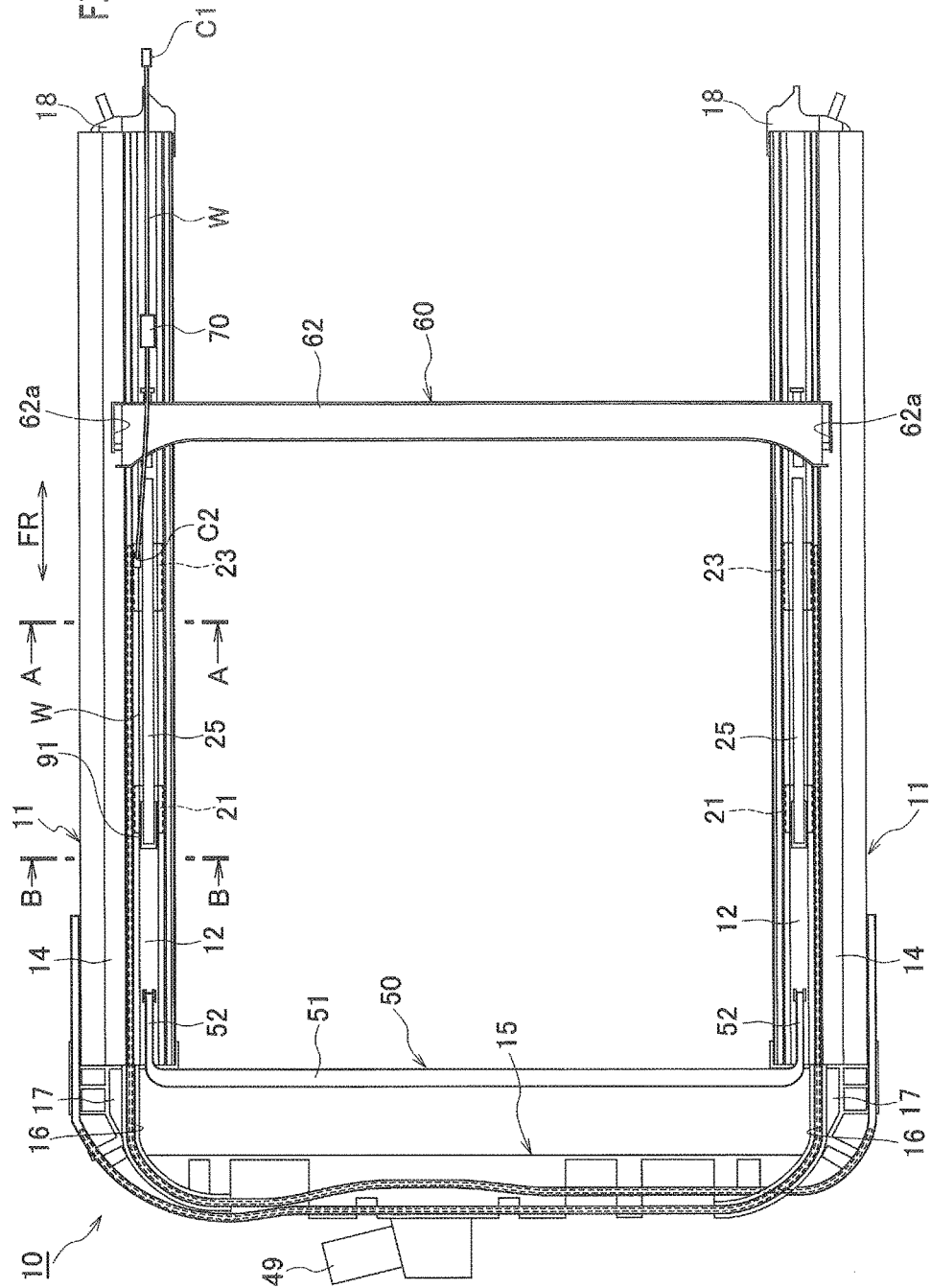
FIG. 1 is a plan view of a sunroof unit to which a power feed structure for movable body according to an embodiment is applied.
Figure 2:
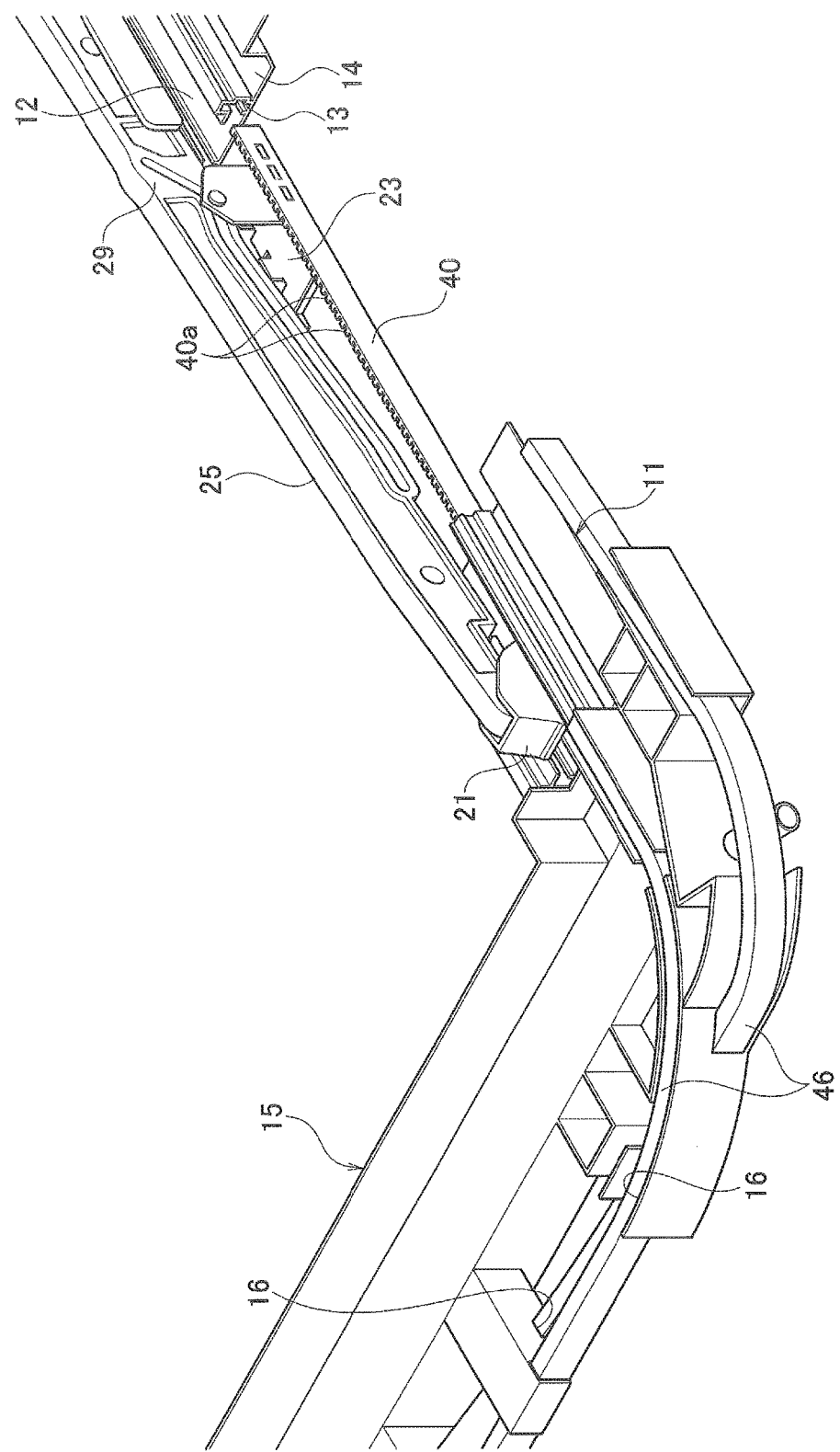
FIG. 2 is a perspective view of an essential part of the sunroof unit according to the embodiment.

Hereinafter, a power feed structure for movable body according to an embodiment will be described with reference to the drawings.

FIGS. 1 to 11 illustrate a sunroof unit 10 to which the power supply structure for the movable body according to the embodiment is applied.

In a vehicle body 1 as a fixed body, as illustrated in FIGS. 3A to 3C, a ceiling panel 2 is provided with an opening 3. The opening 3 is opened and closed by the sunroof unit 10.

The sunroof unit 10 includes a pair of rail members 11 arranged on both sides of the opening 3 in a vehicle width direction, a front frame 15 arranged on a vehicle front side of the opening 3 and connected to respective front ends of the rail members 11, a pair of front sliders 21, a pair of rear sliders 23, and a pair of middle sliders 25, all sliders moving along the pair of rail members 11, a sunroof 30 as a movable body supported on the pair of middle sliders 25, a pair of drive belts 40 for applying a moving force to the sunroof 30, an actuator 49 as a moving source of the drive belts 40, a deflector 50, and a water receiving member 60.

For instance, the respective rail members 11 are made of aluminum alloy. In each of the rail members 11, a slide guide path 12, a belt guide path 13, and a drain path 14 are arranged in a width direction of the rail member 11. The slide guide path 12, the belt guide path 13, and the drain path 14 are arranged so as to extend along a longitudinal direction of the rail members 11.

The belt guide path 13 disposed at left and right sides in the vehicle width direction are positioned outside the slide guide paths 12 in the vehicle width direction. The drain paths 14 disposed on left and right sides in the vehicle width direction are positioned outside the belt guide paths 13 in the vehicle width direction. The drain paths 14 disposed on left and right sides in the vehicle width direction are positioned just below respective gaps between both left and right sides of the sunroof 30 and the ceiling panel 2 to receive water and the like falling from the respective gaps. Each of the drain paths 14 is in the shape of a recessed groove whose upper surface is opened. As illustrated in FIG. 1, a drain cap 18 is attached to each of the rail members 11 at a rear end position of each of the drain paths 14. A drain hose (not illustrated) is connected to each of the drain caps 18.

The front frame 15 is, for example, made of synthetic resinous material. The front frame 15 is provided with two belt wiring paths 16 and a pair of right and left drain paths 17. Each of the belt wiring paths 16 is continuous to the belt guide path 13 of each of the rail members 11. The drain paths 17 of the front frame 15 are continuous to the drain paths 14 of the rail members 11, respectively. A drain cap (not illustrated) is connected to each of the drain paths 17 of the front frame 15 at a front end position of the drain path 17. A drain hose (not illustrated) is connected to the drain cap (not illustrated).

The pair of front sliders 21 and the pair of rear sliders 23 are arranged so as to be slidable on the slide guide paths 12 of the left and right rail members 11 at the same positions in a vehicle longitudinal direction FR. Each of the middle sliders 25 is provided, on its each vehicle front and end side, with a rotation support hole (not numbered). Each of the middle sliders 25 has an elongated cam hole 25b formed to extend in a longitudinal direction of the middle sliders 25. A rotation pin 21a of each of the front sliders 21 is inserted into the rotation support hole on the vehicle front side of each of the middle sliders 25. A cam pin 23a of each of the rear sliders 23 is inserted into the cam hole 25b of each of the middle sliders 25. As for the movement in the vehicle longitudinal direction FR, the pair of middle sliders 25 moves integrally with the pair of front sliders 21. The pair of middle sliders 25 moves in relation to the pair of rear sliders 23 in the vehicle longitudinal direction FR and a vehicle vertical direction TB, depending on the position of the cam pins 23a in the cam holes 25b. By the slider mechanism, the sunroof 30 can be displaced to: a close position to close the opening 3 (see FIG. 3A); a tilt-up position to close the front side of the opening 3 and open the rear side of opening 3 (see FIG. 3B); and an open position to open the opening 3 (see FIG. 3C).

The sunroof 30 is attached to the pair of middle sliders 25. The sunroof 30 includes a laminated panel body (not numbered) including a transparent glass body and a dimming panel, at least in lamination. The dimming panel is in an opaque state under condition that no voltage is applied thereon. With voltage applied thereon, the dimming panel can change its transparency according to an applied voltage level. The dimming panel is fed with power from the vehicle 1. This power feed structure will be described below.

The respective drive belts 40 are made of synthetic resinous material. Each of the driving belts 40 is long in length and has a cross section shaped to be vertical long rectangle. Each of the drive belts 40 is provided, on one surface thereof, with tooth portions 40a which are continuous in a longitudinal direction of each of the drive belts 40. The respective drive belts 40 are disposed in the belt wiring paths 16 of the front frame 15 and the belt guide paths 13 of the pair of rail members 11, respectively. In the region of the belt wiring paths 16 of the front frame 15, the respective drive belts 40 are covered with belt covers 46. Also, in the region of the belt guide paths 13 of the rail members 11, the respective drive belts 40 are covered with belt surrounding walls (not numbered). Owing to this covering, the respective drive belts 40 are prevented from being buckled (causing flexural deformation) easily. Consequently, the pair of drive belts 40 is adapted so as to move describing only predetermined tracks even when pushing out the sunroof 30 from the vehicle front side to the vehicle rear side. The pair of drive belts 40 is fixed, on one-end sides thereof, to the pair of rear sliders 23 (in detail, one drive belt 40 is fixed to one rear slider 23, while the other drive belt 40 is fixed to the other rear slider 23) and also fixed, on the other-end sides, to no member. That is, the pair of drive belts 40 has respective free ends positioned on the other-end sides.

As illustrated in FIG. 1, the actuator 49 is fixed to a substantially central portion of the front frame 15 in the vehicle width direction. In the actuator 49, a pair of output gear parts (not illustrated) meshes with the tooth parts 40a of the pair of drive belts 40, respectively. The pair of output gear parts rotates mutually in opposite directions. As a result, the pair of drive belts 40 moves mutually in opposite directions, so that the pair of rear sliders 23 moves at the same position in the vehicle longitudinal direction FR mutually synchronously.

The deflector 50 includes a deflector body 51 and a pair of swing arms 52 rotatably supported to both left and right ends of the deflector body 51. At the front end of the opening 3 of the ceiling panel 2, the deflector body 51 is arranged so as to extend over the entire region of the opening 3 in the vehicle width direction. The deflector body 51 has a front-end side formed in an arc shape. Consequently, when the opening 3 is opened, strong wind from the outside is prevented from directly entering a passenger compartment through the opening 3.

The pair of swing arms 52 is rotatably supported on the pair of rail members 11. With the pivotal movement of the pair of swing arms 52, the deflector body 51 is displaceable between a standby position (i.e. position of FIGS. 3A and 3B) where the deflector body 51 is positioned below the opening 3 of the ceiling panel 2 and a wind-avoiding position (i.e. position of FIG. 3C) where the deflector body 51 projects above the ceiling panel 2 through the opening 3. The deflector body 51 is urged toward the wind-avoiding position by a spring force of a torsion spring 53. The deflector body 51 is positioned on the sliding tracks of the front sliders 21, and when the front sliders 21 are located in the close position of FIG. 3A and the tilt-up position of FIG. 3B, the pair of swing arms 52 is positioned in the standby position against the spring force of the torsion spring 53 while receiving a pressing force from the front sliders 21. When the front slides 21 are located in the open position of FIG. 3C, the deflector body 51 is positioned in the wind-avoiding position by the spring force of the torsion spring 53 without receiving the pressing force from the front sliders 21.

On the rear-end side of the opening 3, the water receiving member 60 is arranged so as to extend over the entire region of the opening 3 in the vehicle width direction. The water receiving member 60 includes slide parts (not illustrated) slidably supported on the pair of rail members 11, a water receiving body 62 held by the slide parts and also provided with a water receiving groove (not illustrated), and a pair of arm parts 63 fixed to both ends of the water receiving body 62 in the vehicle width direction. In the water receiving body 62, the water receiving groove (not illustrated) is formed with drain ports 62a (see FIG. 1) just above the drain paths 14 of the pair of rail members 11, respectively. The distal ends of the pair of arm parts 63 are rotatably supported by the middle sliders 25. The water receiving member 60 moves following the movement of the middle sliders 25 in the vehicle longitudinal direction FR and the vertical movement of the rear ends of the middle sliders 25.

When the sunroof 30 is located in the close position of FIG. 3A, the water receiving body 62 of the water receiving member 60 is positioned close to the rear end of the opening 3 and receives water and the like falling from a gap between the sunroof 30 and the ceiling panel 2. When the sunroof 30 is located in the tilt-up position of FIG. 3B, the water receiving body 62 is positioned close to the rear end of the opening 3 and receives water and the like falling from the opening 3. When the sunroof 30 is located in the open position of FIG. 3C, the water receiving body 62 is positioned in a retracted position inside the ceiling panel 2. Water and the like received by the water receiving body 62 fall from the drain ports 62a into the drain paths 14 of the rail members 11 and subsequently flow in the drain paths 14 of the rail members 11 toward respective front or rear ends of the drain path 14. Then, water and the like are finally discharged to the outside by the drain hoses (not illustrated) through the drain caps 18.

Figure 5:
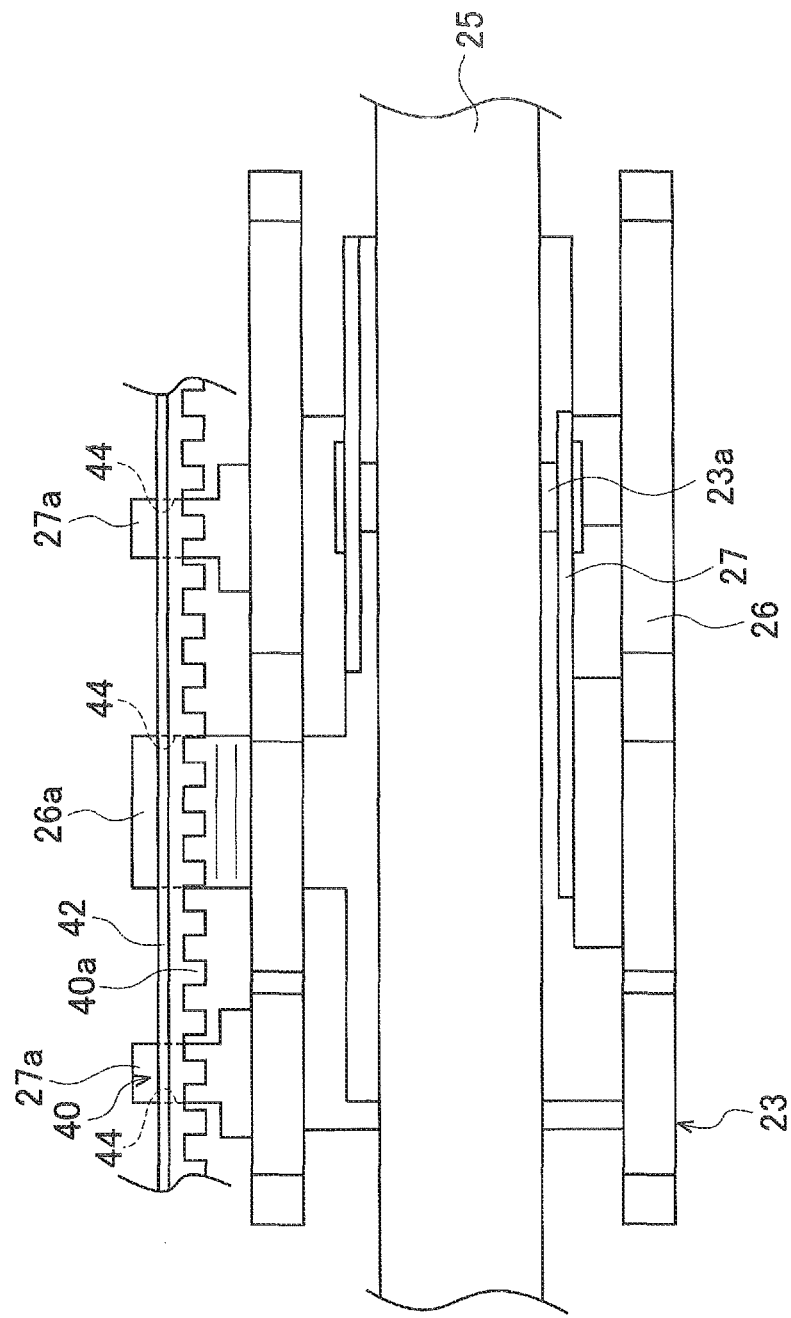
FIG. 5 is a top view of the rear slider and the rail member of the sunroof unit according to the embodiment.
Figure 6:
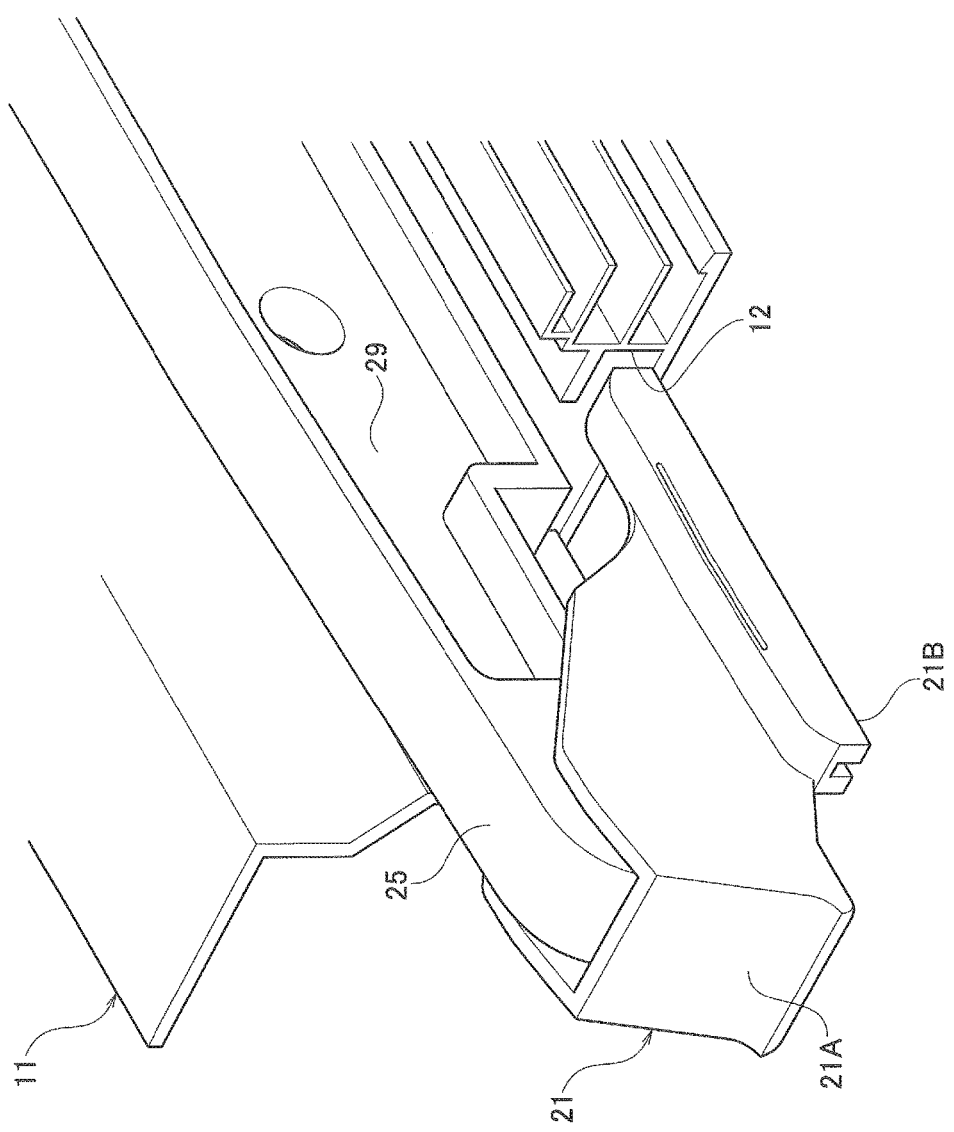
FIG. 6 is a perspective view illustrating a front slider and the rail member of the sunroof unit according to the embodiment.
Figure 7:
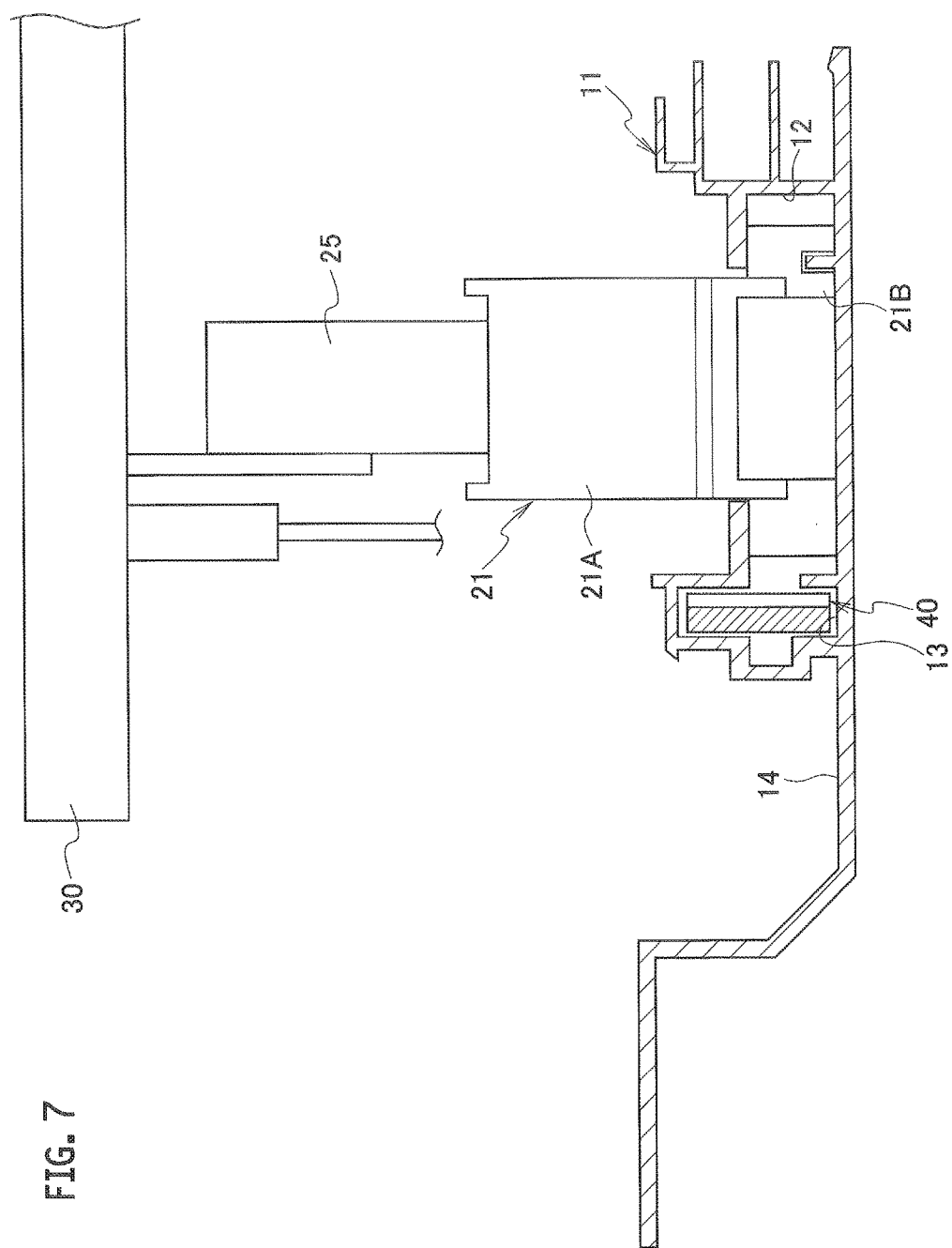
FIG. 7 is a sectional view of the front slider and the rail member of the sunroof unit according to the embodiment (sectional view taken along a line B-B of FIG. 1).

Next, a fixing structure between the respective drive belts 40 and the respective rear sliders 23 will be described. As illustrated in FIGS. 4 and 5 clearly, each of the rear sliders 23 includes a resinous block 26 and a metal bracket 27 fitted to the resinous block 26. A portion of the resinous block 26 is disposed in the slide guide path 12. The resinous block 26 is provided with a single fitting projection 26a, while the metal bracket 27 is provided with two fitting projections 27a. The two fitting protrusions 27a of the metal bracket 27 are disposed on either side of the fitting protrusion 26a of the resinous block 26 in the vehicle longitudinal direction FR. The driving belt 40 is provided, on one end side thereof, with fitting holes 44 which open at respective positions corresponding to the fitting projection 26a of the resinous block 26 and the fitting projections 27a of the metal bracket 27. The drive belts 40 are linked to the rear sliders 23 since the fitting projection 26a of the resinous block 26 and the fitting protrusions 27a of the metal bracket 27 engage with the fitting holes 44 formed in the drive belt 40 respectively.

Figure 8:
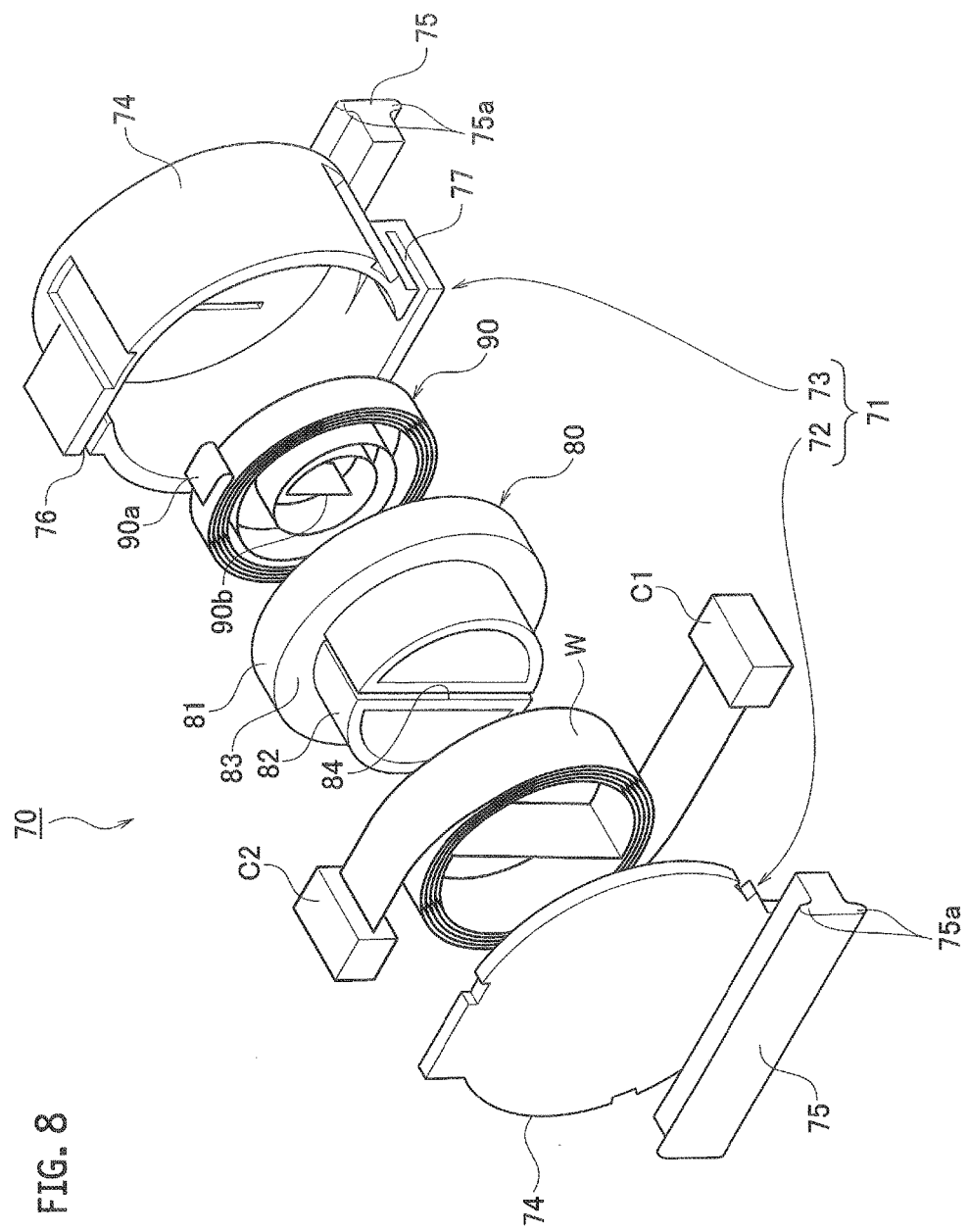
FIG. 8 is a perspective view of an excess length absorbing mechanism of the power feed structure for movable body according to the embodiment.

Next, the power feed structure from the vehicle body 1 to the sunroof 30 will be described. As illustrated in FIGS. 1, 8, and the like, the power supply structure for movable body includes a flat electric wire W wired along one of the rail members 11 and an excess length absorbing mechanism 70 arranged on the way of a wiring route for the flat electric wire W to absorb an excess portion of the flat electric wire W.

A connector C1 on one end of the flat electric wire W is connected to a connector (not illustrated) on the vehicle body 1. A connector C2 on the other end of the flat electric wire W is connected to a connector (not illustrated) on the sunroof 30. The flat electric wire W is a flexible flat cable. In the flat electric wire W, the outer circumference of an insulating layer is further covered with a protective layer (not illustrated).

Figure 11A:
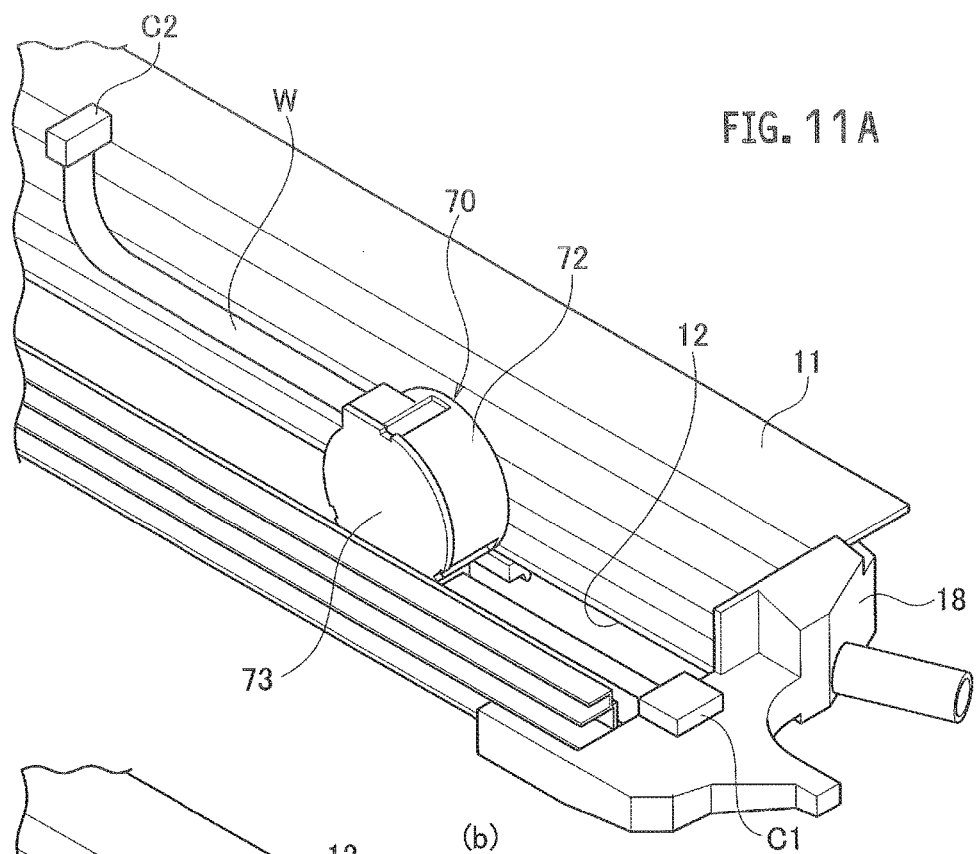
FIG. 11A is a perspective view of the excess absorbing mechanism arranged on the rail member.
Figure 11B:
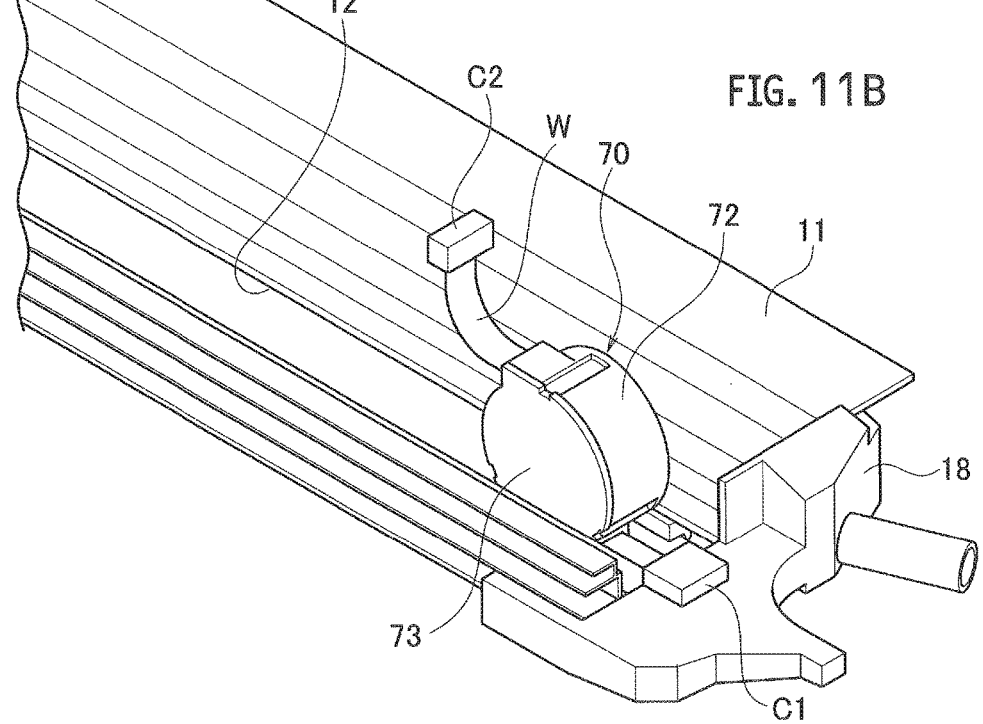
FIG. 11B is a perspective view of the excess absorbing mechanism positioned in the lowermost position (vehicle rear side) of the rail member.

As illustrated in FIG. 11 clearly, the excess length absorbing mechanism 70 is arranged so as to be slidable on one of the rail members 11, as similar to the sliders 21, 23 25. The slide structure will be described below.

The excess length absorbing mechanism 70 includes a casing 71, a rotating body 80 housed in the casing 71, and a spiral spring 90 as an urging member housed in the casing 71.

The casing 71 has a generally cylindrical shape whose both sides are closed. The casing 71 includes two divided casing bodies 72, 73 assembled to each other. The casing 71 includes a wire winding casing part 74 and a pair of sliding parts 75. On the side of the divided casing body 73, the wire winding casing part 74 is provided, on an outer circumferential wall thereof, with a first wire port 76. Additionally, the divided casing body 73 is provided with a second wire port 77 in the vicinity of the sliding part 75. The first wire port 76 is arranged at a high position compared with the sliding part 75. On the other hand, the second wire port 77 is positioned at the same height as the sliding part 75.

Figure 9:
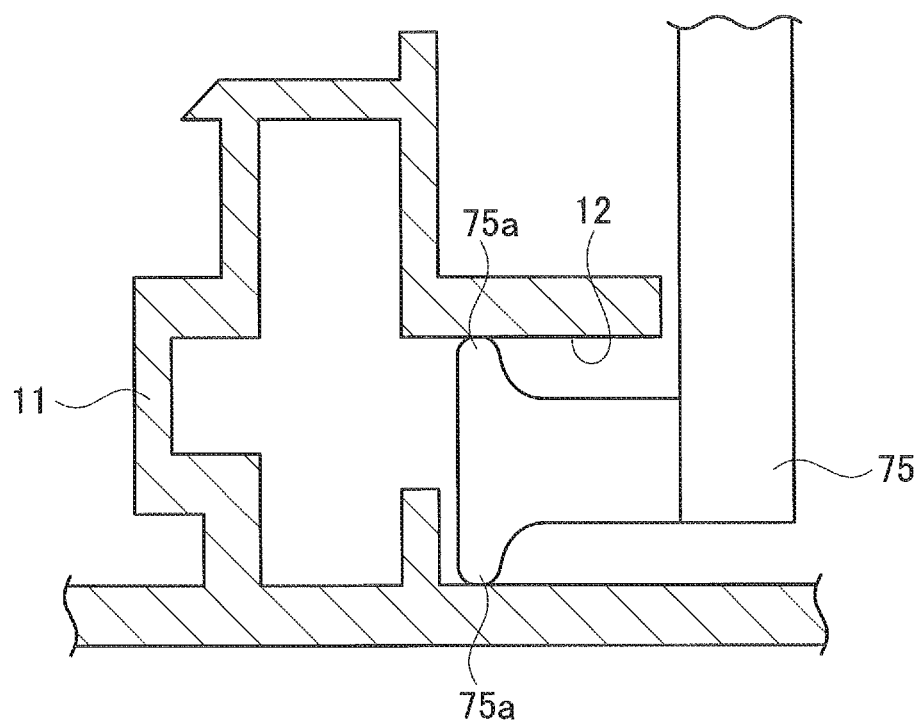
FIG. 9 is a sectional view of a sliding part of the excess length absorbing mechanism of the power feed structure for movable body according to the embodiment.

As illustrated in FIG. 9 clearly, each of the sliding parts 75 is disposed in the slide guide path 12 of the rail member 11. Each of the sliding parts 75 is provided with upper and lower sliding projections 75a extending along the longitudinal direction of the rail member 11. The upper and lower sliding projections 75a abut on upper and lower inner surfaces of the slide guide path 12. Accordingly, the excess length absorbing mechanism 70 slides in line contact with the rail member 11. In this way, due to smallness in contact area between the projections 75a and the rail member 11, the excess length absorbing mechanism 70 exhibits a reduced sliding resistance against the rail member 11.

The rotating body 80 is formed by an integrated member. The rotating body 80 includes a rotating guide circumferential wall 81 having an inner diameter slightly smaller than the inner diameter of the divided casing body 73, a wire winding part 82 axially shifted from the rotating guide circumferential wall 81, and a side wall 83 connecting the rotating guide circumferential wall 81 with the wire winding part 82. The rotating body 80 is rotatably housed in the casing 71 (the divided casing bodies 72, 73) since the rotating guide circumferential wall 81 is guided by the inner circumferential wall of the divided casing body 73.

The wire winding part 82 is formed with a slit 84 which passes through a rotation center of the wire winding part 82. The slit 84 is opened at opposite positions of 180 degrees of the wire winding part 82.

The flat electric wire W is inserted, at the just intermediate position in the longitudinal direction, into the slit 84 and fixed to the rotating body 80 at this position. The flat electric wire W led to the outer circumference of the wire winding part 82 through one opening of the slit 84 is pulled out of the casing 71 through the first wire port 76 under a condition that the flat electric wire W can be wound around the wire winding part 82. The flat electric wire W pulled out of the casing 71 through the first wire port 76 is further connected to the movable body (sunroof 30) through a connector C2 at the end of the wire W.

The flat electric wire W led to the outer circumference of the wire winding part 82 through the other opening of the slit 84 is pulled out of the casing 71 through the second wire port 77 under the condition that the flat electric wire W can be wound around the wire winding part 82. The flat electric wire W pulled out of the casing through the second wire port 77 is further connected to the vehicle body 1 (fixed part) through a connector C1 at the end of the wire W.

The spiral spring 90 is disposed in the inner circumferential space of the rotating guide circumferential wall 81. The spiral spring 90 has the outer circumferential end 90a hooked to the rotating body 80 and the inner circumferential end 90b hooked to the casing 71. The spiral spring 90 urges the rotating body 80 in a direction (i.e. a direction illustrated with arrows R of FIGS. 10A and 10B) to wind the flat electric wire W on the sunroof (movable body) 30 and the flat electric wire W on the vehicle body (fixed part) 1 together.

In the above-mentioned constitution, when the actuator 49 is driven, the pair of drive belts 40 moves in a manner that their one ends occupy the same position in the vehicle longitudinal direction FR, thereby allowing the sunroof 30 to be displaced to respective positions of three patterns as illustrated in FIGS. 3A, 3B, and 3C.

When the sunroof 30 moves in a direction away from the excess length absorbing mechanism 70, the rotating body 80 rotates against the spring force of the spiral spring 90, so that the excess length absorption mechanism 70 moves on the rail member 11 toward the sunroof 30 while drawing out the flat electric wire W on the sunroof 30 and the flat electric wire W on the vehicle body 1, both of which have been wound around the wire winding part 82. While drawing out the flat electric wire W on the sunroof 30 and the flat electric wire W on the vehicle body 1 by the same quantity and length, the excess length absorbing mechanism 70 moves at a half speed of the sunroof 30.

Figure 10A:
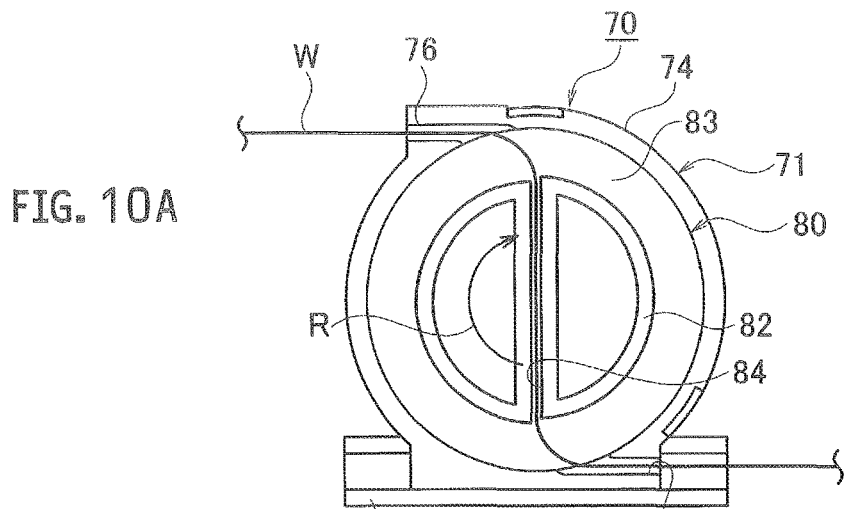
FIG. 10A is a schematic sectional view of the excess length absorbing mechanism in a state where the major part of an electric wire is drawn out (sunroof: a close position, a tilt position)
Figure 10B:
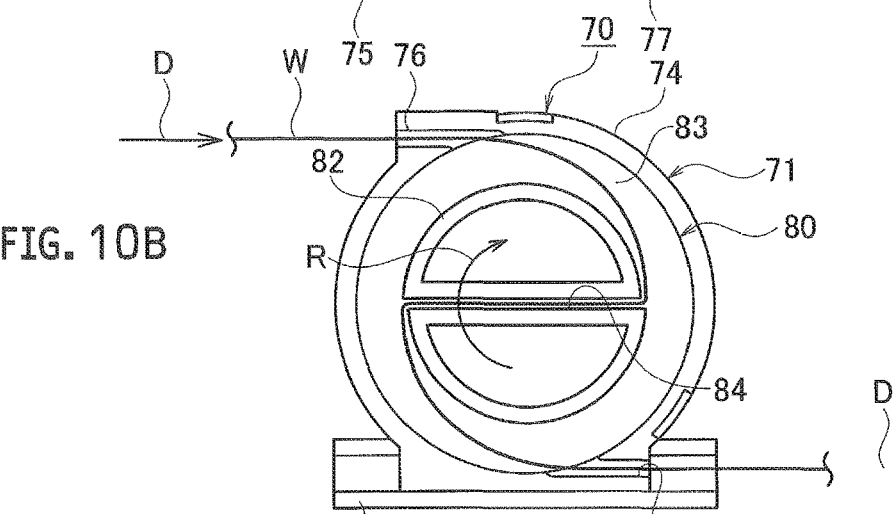
FIG. 10B is a schematic sectional view of the excess length absorbing mechanism in a state where a nearly half of the electric wire is drawn out (sunroof: an intermediate position between the close position and the open position)
Figure 10C:
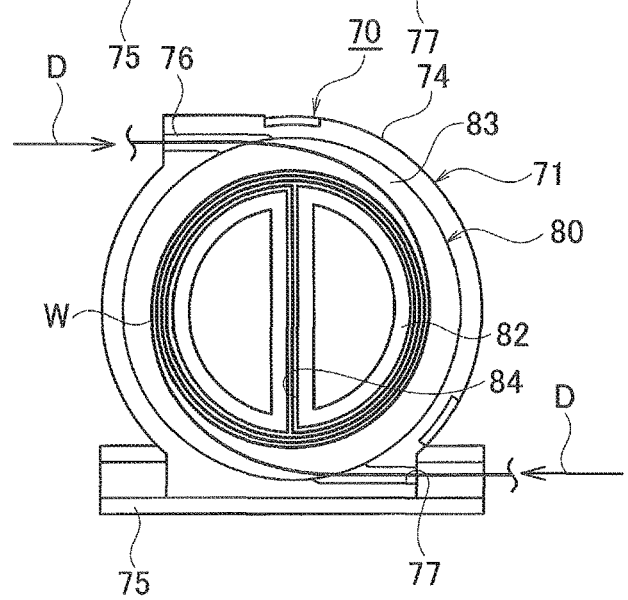
FIG. 10C is a schematic sectional view of the excess length absorbing mechanism in a state where the major part of the electric wire is rewound (sunroof: the close position).

When the sunroof 30 moves in a direction approaching the excess length absorbing mechanism 70, the rotating body 80 rotates by the spring force of the spiral spring 90 and as illustrated with arrows D of FIGS. 10B and 10C, the excess length absorbing mechanism 70 moves on the rail member 11 in a direction away from the sunroof 30 while winding the flat electric wire W on the sunroof 30 and the flat electric wire W on the vehicle body 1 around the wire winding part 82 (i.e. transition states from FIG. 10A to FIG. 10B and from FIG. 10B to FIG. 10C). Thus, an excess length of the wire W is absorbed. While winding the flat electric wire W on the sunroof 30 and the flat electric wire W on the vehicle body 1 by the same quantity and length, the excess length absorbing mechanism 70 moves at a half speed of the sunroof 30.

Thus, in the displacements of the sunroof 30 of three patterns, the sunroof 30 is always supplied with power from a power source on the vehicle body 1 through the flat electric wire W.

As described above, the power feed structure for movable body includes the rail members 11 fixed to the vehicle body 1 as the fixed part, the sliders 21, 23, 25 moving along the rail members 11, the sunroof 30 as the movable body supported on the sliders 21, 23, 25, the flat electric wire W, and the excess length absorbing mechanism 70 for winding an excess length portion of the flat electric wire W. The power feed structure for movable body performed a power feeding from the vehicle body 1 to the sunroof 30. The excess length absorbing mechanism 70 is arranged so as to be movable along one of the rail members 11. The excess length absorbing mechanism 70 includes the rotating body 80 having the wire winding part 82 for winding both the flat electric wire W on the sunroof 30 and the flat electric wire W on the vehicle body 1 and the spiral spring 90 as the urging member for urging the rotating body 80 in the direction to wind the flat electric wire W on the sunroof 30 and the flat electric wire W on the vehicle body 1 together.

With the constitution mentioned above, it is necessary only to attach the excess length absorbing mechanism 70 to one of the rail members 11 on which the sliders 21, 23, 25 move. Thus, as there is no need of installing a special rail member, the excess length absorbing mechanism 70 can be installed with ease.

In the excess length absorbing mechanism 70, additionally, since the rotating body 80 for winding the flat electric wire W and the spiral spring 90 for urging the rotating body 80 are arranged about the rotation center, the mechanism 70 is simple in structure. From above, it is possible to provide a power feed structure for movable body, which can be installed easily and configured compactly.

The electric wire W on the sunroof 30 and the flat electric wire W on the vehicle body 1 are fixed to the wire winding part 82 at opposite positions of 180 degrees. Therefore, although the wire winding part 82 is subjected to a tension from the flat electric wire W on the sunroof 30 and a tension from the flat electric wire W on the vehicle body 1, these tensions do not act on the wire winding part 82, in the form of an unbalanced load.

The flat electric wire W is arranged along one of the rail members 11, while the excess length absorbing mechanism 70 is arranged at the end of one of the rail members 11 in the direction to allow movements of the sliders 21, 23, 25. Thus, it is possible to utilize a space for the rail members 11 on which the sliders 21, 23, 25 move, as a wiring space for the flat electric wire W and therefore, it is unnecessary to ensure a space special for wiring the flat electric wire W.

(Modifications)

Figure 12A:
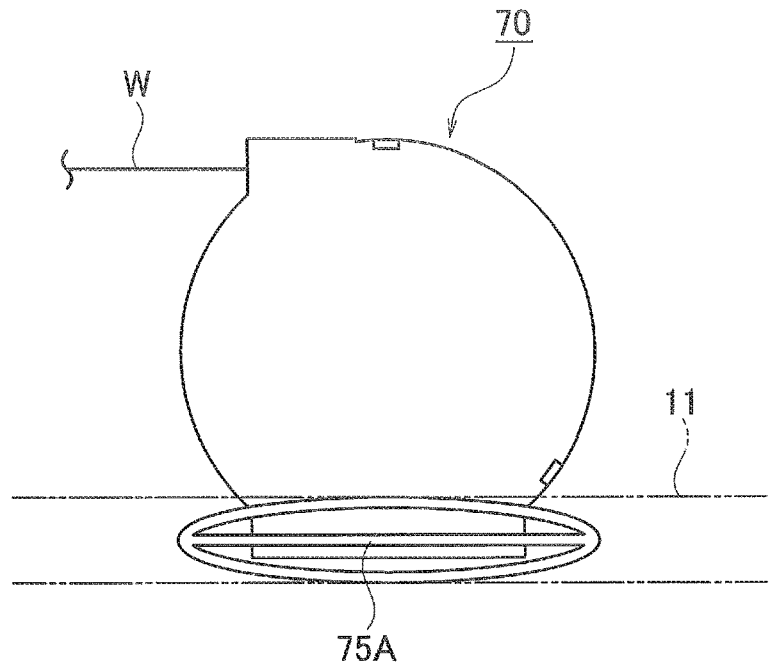
FIG. 12A is a sectional view of a sliding part of an excess absorbing mechanism of a power feeding mechanism according to a first modification.

FIG. 12A illustrates a sliding part 75A of a power feed structure for movable body according to a first modification. The sliding part 75A is in the form of a plate spring and comes into contact with upper and lower inner surfaces of the rail member 11 due to its spring force.

Figure 12B:
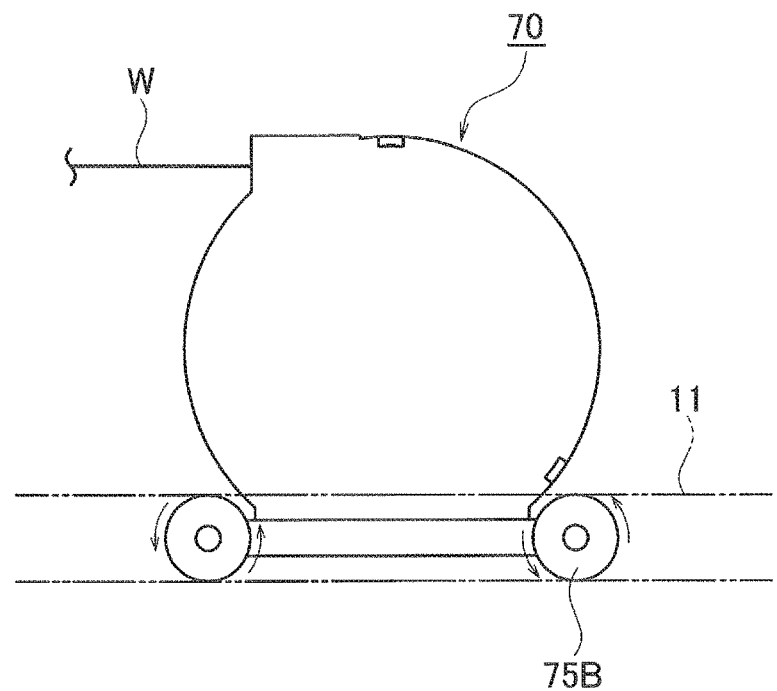
FIG. 12B is a sectional view of the excess absorbing mechanism of a power feeding mechanism according to a second modification.

FIG. 12B illustrates a sliding part 75B of a power feed structure for movable body according to a second modification. The sliding part 75B of the second modification is rotating bodies and moves along the rail member 11 while being rotated.

Figure 13A:
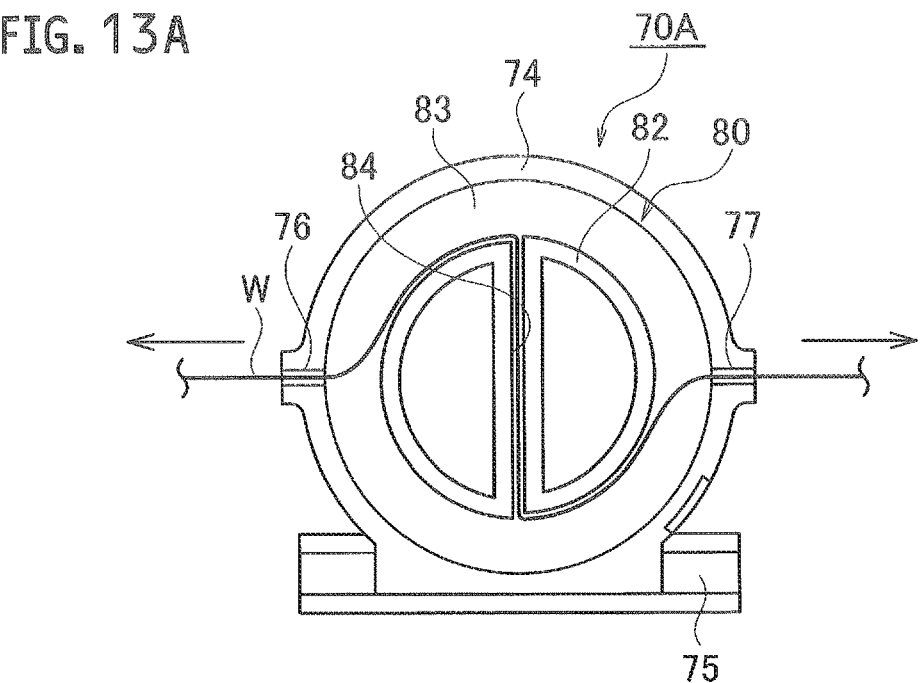
FIG. 13A is a sectional view illustrating a first wire port and a second wire port of an excess absorbing mechanism of a power feeding mechanism according to a third modification.

FIG. 13A illustrates a first wire port 76 and a second wire port 77 of an excess length absorbing mechanism 70A of a power feed structure for movable body according to a third modification. In the excess length absorbing mechanism 70A, the first wire port 76 and the second wire port 77 are each arranged at the same level with respect to the sliding part 75. More in detail, the first wire port 76 and the second wire port 77 are arranged at the same level as the rotation center of the rotating body 80.

Although the casing 71 is subjected to an external force from the flat electric wire W on the sunroof 30 and an external force from the flat electric wire W on the vehicle body 1, no rotating force is applied to the casing 1 since the rotating forces by these external forces are cancelled each other. As a result, the excess length absorbing mechanism 70A slides smoothly.

Figure 13B:
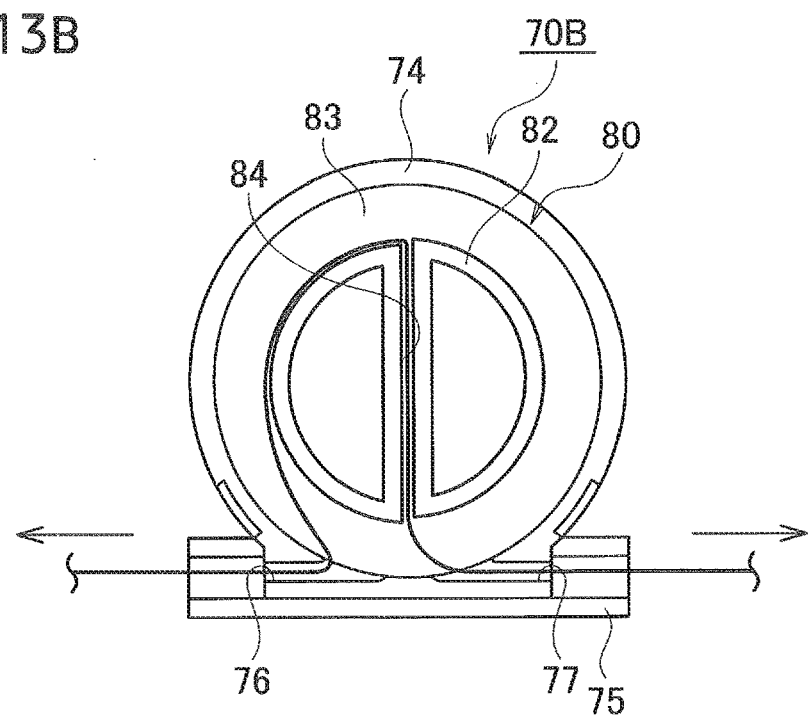
FIG. 13B is a sectional view illustrating a first wire port and a second wire port of an excess absorbing mechanism of a power feeding mechanism according to a fourth modification.

FIG. 13B illustrates a first wire port 76 and a second wire port 77 of an excess length absorbing mechanism 70B of a power feed structure for movable body according to a fourth modification. In the excess length absorbing mechanism 70B, the first wire port 76 and the second wire port 77 are each arranged at the same level with respect to the sliding part 75, as similar to the third modification. Nevertheless, different from the third modification, the first wire port 76 and the second wire port 77 are arranged at the same level as the sliding part 75.

Also in the fourth modification, no rotating force is applied to the casing 71 since the rotating forces by these external forces are cancelled each other, as similar to the third modification. Moreover, even if two external forces become different from each other for any reason, the casing 71B would not be subjected to a great rotating force.

Figure 14:
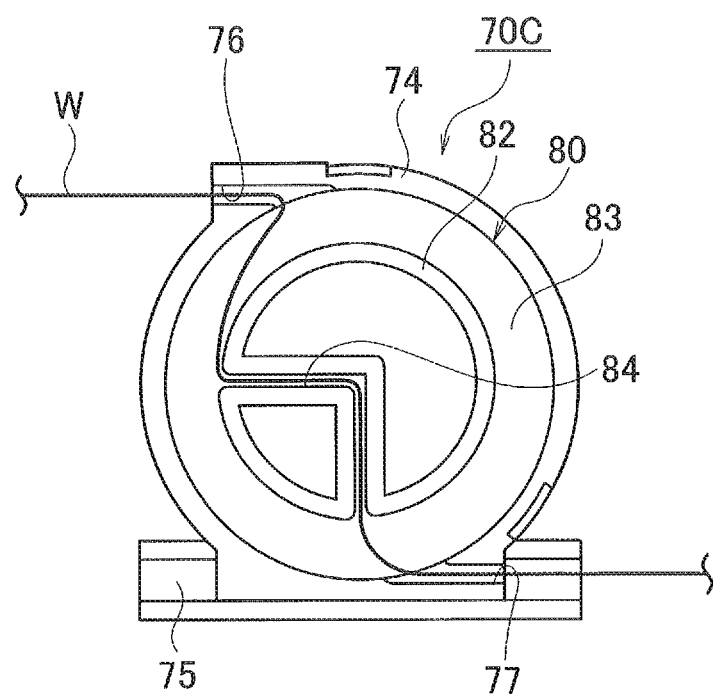
FIG. 14 is a sectional view illustrating a wire winding part of a power feeding mechanism according to a fifth modification.

FIG. 14 illustrates a slit 84 of a wire winding part 82 of a power feed structure for movable body according to a fifth modification. In the slit 84 according to the fifth modification, two openings are formed at rotational positions of 90 degrees. The two openings of the slit 84 may be formed at any positions or the same position. As described in the embodiment, however, if the two openings are formed at opposite rotational positions of 180 degrees, a tension from the flat electric wire W on the sunroof 30 and a tension from the flat electric wire W on the vehicle body 1 do not act on the wire winding part 82, in the form of an unbalanced load.

Figure 15A:
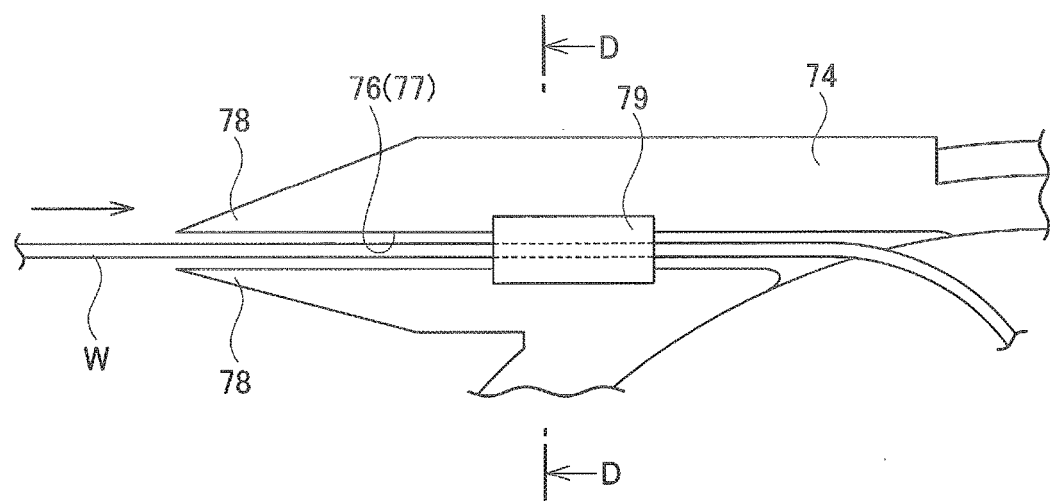
FIG. 15A is a plan view illustrating an arrangement where a wiping member is attached to the first wire port and the second wire port of the excess absorbing mechanism.
Figure 15B:
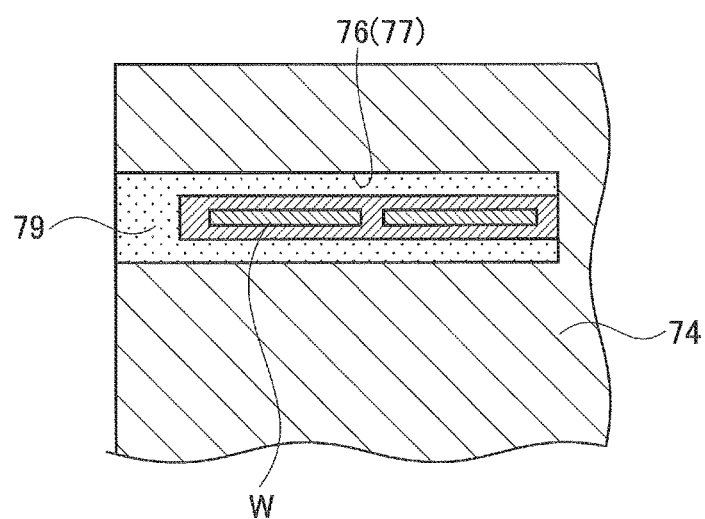
FIG. 15B is a sectional view taken along a line D-D of FIG. 15A.
Figure 16:
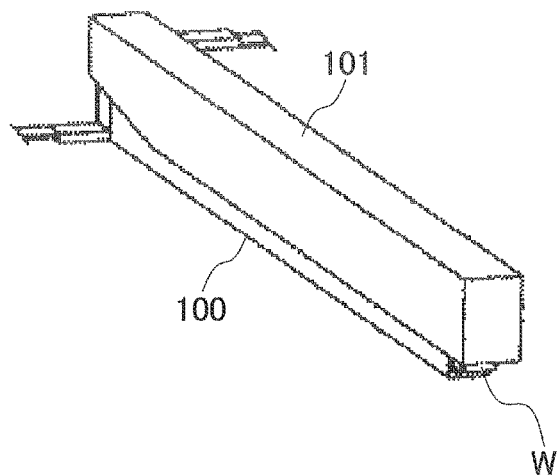
FIG. 16 is a perspective view illustrating a power feed structure for movable body in a conventional example where a sunroof is an open position.
Figure 17:
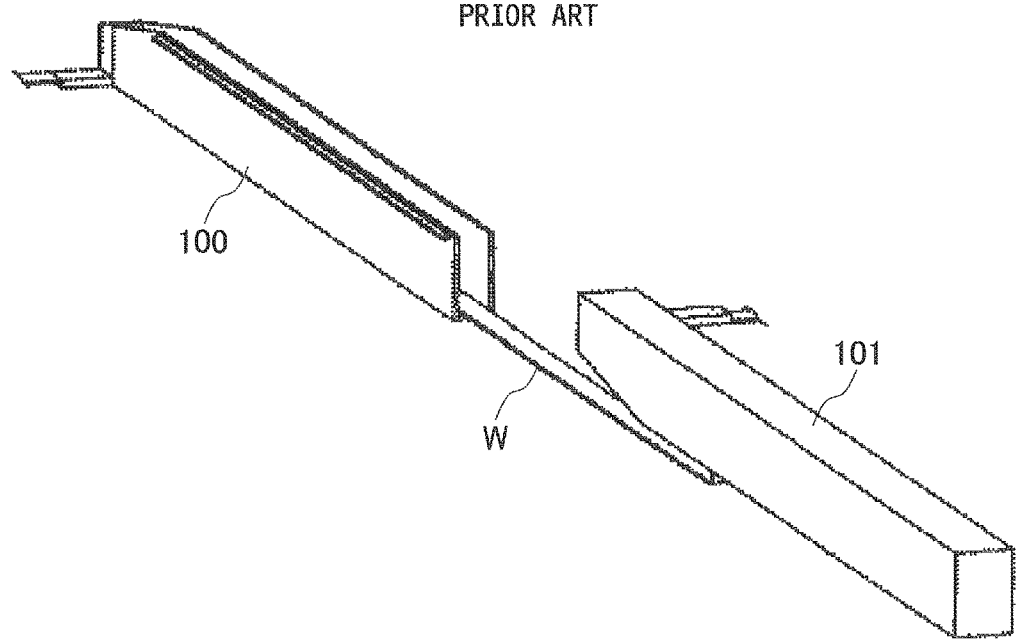
FIG. 17 is a perspective view illustrating the power feed structure for movable body in the conventional example where the sunroof is a close position.
Figure 18:
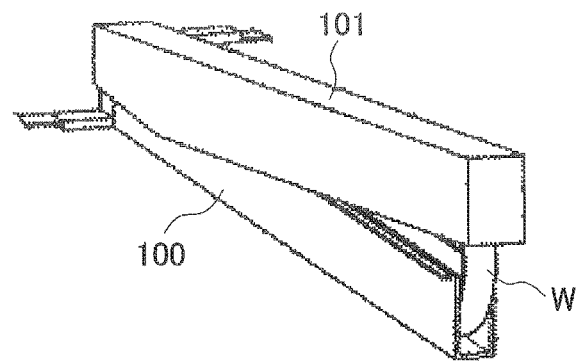
FIG. 18 is a perspective view illustrating the power feed structure for movable body in the conventional example where the sunroof is a tilt-up position.
Figure 19:
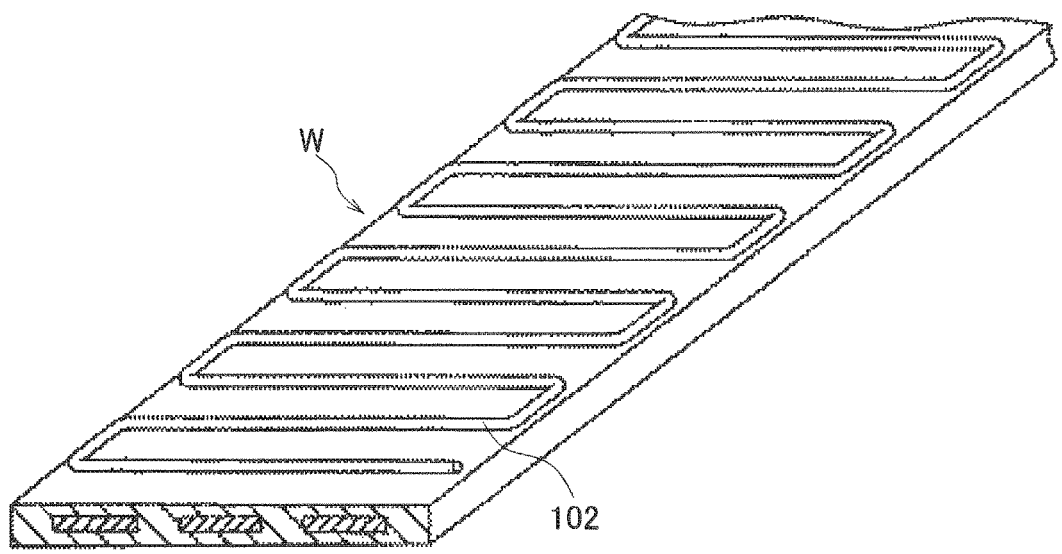
FIG. 19 is a perspective view illustrating a flat electric wire of the power feed structure for movable body in the conventional example.

FIGS. 15A and 15B illustrate a first wire port 76 (and/or a second wire port 77) of a power feed structure for movable body according to a sixth modification. A distal end portion of the first wire port 76 according to the sixth modification is formed with a tapered part 78. The first wire port 76 is provided with a wiping member (sponge material) 79. The flat electric wire W is wound into the casing 71 of the excess length absorbing mechanism 70 while being sliding on the tapered part 78 and the wiping member 79. Then, water, dust, and the like adhering to the flat electric wire W are brushed off by the tapered part 78 and successively wiped off by the wiping member 79. In this way, it is possible to prevent water, dust, and the like adhering to the flat electric wire W from entering the casing 71, thereby effecting waterproof/dustproof functions.

(Applications)

Although the embodiment has been described with an illustration where the sunroof 30 has a dimming panel to be fed with power, the present application is also applicable to an arrangement where the sunroof 30 is provided with a touch sensor which prevents a pinching of an obstacle by the sunroof 30 and which is also fed with power. When such an obstacle is detected by the touch sensor, it may be executed to reverse the rotation of an actuator motor of the sunroof 30.

As a movable-body side object to be fed with power, there may be a lighting (LED illumination) mounted on the sunroof 30.

Although the embodiment has been described with an example of the power feed structure for the sunroof 30 as the movable body, the present application is also applicable to a power feed structure for any movable body moving to the vehicle body 1, for example, sunshade, side glass, seats or the like. Additionally, the present application can be also applied to a power feed structure for a movable body other than a vehicle.

According to the embodiment, as the electric wire is in the form of a flat wire W, it is easy to establish a winding or spiral configuration of the wire. Nevertheless, any type of wire may be employed for the electric wire, for example, a cable having a circular cross section.

Although the excess length absorbing mechanism 70 has a rotating axis in a horizontal direction and the flat electric wire W has its flat surface to be drawn out laterally (sideways) in the illustrated embodiment, the excess length absorbing mechanism 70 may have a rotating axis extending in a vertical direction while the flat surface of the flat electric wire W is being drawn out vertically (longitudinally). Alternatively, the excess length absorbing mechanism 70 may be provided with a rotating axis extending in any other direction and additionally, the flat surface of the flat electric wire W may be drawn out in any orientation.

In a case of adopting a solar panel in place of the movable glass, the present application can be also utilized for the power feeding from the solar panel (movable body) to the vehicle body 1.

What is claimed is:

1. A power feed structure for a movable body, comprising:
   a rail member fixed to a fixed part;
   a slider configured to move along the rail member;
   a sunroof supported on the rail member;
   a flat electric wire having one end connected to the fixed part and the other end connected to the sunroof; and
   an excess length absorbing mechanism configured to wind an excess portion of the flat electric wire, wherein
   the power feed structure is configured so as to feed power from one of the fixed part and the sunroof to the other,
   the flat electric wire is routed along the rail member,
   the excess length absorbing mechanism is arranged so as to be movable along the rail member on a wiring route for the flat electric wire, and
   the excess length absorbing mechanism comprises:
      a casing slidably provided on the rail member,
      a rotating body accommodated in the casing, the rotating body comprising a wire winding part configured to wind a first of the excess portion of the flat electric wire extending toward the movable body and to wind a second of the excess portion of the flat electric wire extending toward the fixed part; and
      an urging member configured to urge the rotating body to a winding direction to wind the first of the excess portion of the flat electric wire and to wind the second of the excess portion of the flat electric wire.

2. The power feed structure of claim 1, wherein
   the first of the excess portion of the flat electric wire and the second of the excess portion of the flat electric wire are fixed to the wire winding part at opposite positions of 180 degrees.

3. The power feed structure of claim 1, wherein
   the casing comprises a sliding part configured to slide on the rail member, a first wire port configured to draw the first of the excess portion of the flat electric wire from the casing, and a second wire port configured to draw the second of the excess portion of the flat electric wire from the casing, and
   the first wire port and the second wire port are each arranged at a same horizontal level with respect to the sliding part.

4. The power feed structure of claim 3, wherein
   the first wire port and the second wire port are arranged at a same horizontal level as a rotation center of the rotating body.

5. The power feed structure of claim 1, wherein the flat electric wire comprises a first connector at one end of the flat electric wire and a second connector on the other end of the flat electric wire.

6. The power feed structure of claim 1, wherein the urging member comprises a spiral spring.

\* \* \* \* \*